US012651071B2

(12) United States Patent
Marek

(10) Patent No.: US 12,651,071 B2
(45) Date of Patent: Jun. 9, 2026

(54) SECURE MPSoC FPGA WITH EMBEDDED HARD CORE PROCESSOR SYSTEM AND METHOD

(71) Applicant: ROCKWELL COLLINS, INC., Cedar Rapids, IA (US)

(72) Inventor: James A Marek, Anamosa, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 134 days.

(21) Appl. No.: 18/795,716

(22) Filed: Aug. 6, 2024

(65) Prior Publication Data

US 2026/0044605 A1 Feb. 12, 2026

(51) Int. Cl.
*G06F 21/57* (2013.01)

(52) U.S. Cl.
CPC ...... *G06F 21/575* (2013.01); *G06F 2221/034* (2013.01)

(58) Field of Classification Search
CPC .................................................. G06F 21/575
See application file for complete search history.

(56) References Cited

U.S. PATENT DOCUMENTS

| 7,958,396 B2 | 6/2011 | Chitsaz et al. |
| 9,810,736 B2 | 11/2017 | Cottrell et al. |
| 9,940,483 B2 | 4/2018 | Areno et al. |
| 10,402,566 B2 | 9/2019 | Kibalo et al. |
| 11,321,470 B1 * | 5/2022 | Dozer .................. G06F 21/602 |
| 2019/0033453 A1 * | 1/2019 | Crouch ................ H04B 10/505 |

FOREIGN PATENT DOCUMENTS

CN     111026573 B     8/2023

* cited by examiner

*Primary Examiner* — Terrell S Johnson
(74) *Attorney, Agent, or Firm* — Christopher B. Kilner; MILLEN, WHITE, ZELANO & BRANIGAN

(57) ABSTRACT

A system and method for securing a system-on-chip (SoC) field programmable gate array (FPGA) is provided, wherein the SoC FPGA includes an FPGA fabric, a soft core processor hosted within the FPGA fabric, a hard core processor, and a secure boot environment for the SOC FPGA. Monitoring logic monitors for a change in the FPGA fabric. External watchdog logic is configured to receive a trigger signal from the monitoring logic, and force the hard core processor(s) of the SoC FPGA into a reset state with no ability to recover unless power is cycled when a change has been made to the FPGA fabric, so as to provide a "fail secure" scenario. The monitoring logic may be firmware hosted on the FPGA fabric, software hosted on the soft core, software hosted on the hard core, and/or external hard logic.

20 Claims, 5 Drawing Sheets

401

START

SECURE BOOT SOC FBGA 410

MONITOR FOR CHANGES IN FPGA FABRIC OR HARD CORE SW 422

ANY CHANGES OCCURED? 432

NO

YES

SEND TRIGGER TO WATCHDOG LOGIC 442

FORCE HARD REST OF HARD CORE PROCESSOR 450

END

SECURE MPSoC FPGA WITH EMBEDDED HARD CORE PROCESSOR SYSTEM AND METHOD

FIELD OF THE INVENTION

The subject matter disclosed herein relates to Multiple Processor (MP) System-on-Chip (SoC) Field-Programmable Gate Arrays (FPGAs) having soft core and hard core processors and, in particular, to a secure multi-processor MPSoC FPGA system and method that is "fail secure."

BACKGROUND OF THE INVENTION

An FPGA is an integrated circuit designed to be configured by a customer or a designer after manufacturing. The FPGA configuration is generally specified using a hardware description language (HDL), which is similar to the language used for an application-specific integrated circuit (ASIC). An FPGA includes a "fabric" that contains an array of programmable logic blocks, and a hierarchy of reconfigurable interconnects that allow the blocks to be arranged in different configurations. The logic blocks can be configured to perform complex combinational functions or simple logic gates, like AND and XOR.

In addition to the programmable logic, an FPGA may include central processing units (CPUs) to execute a variety of software stored on an external machine-readable medium. With its small size, CPUs, and programmable logic, an FPGA is an ideal device for executing tasks in an embedded environment. In some instances, the embedded environment may be used to perform tasks on sensitive data where maintaining the security of the data is a non-trivial concern. Thus, ensuring that the FPGA is operating in a secure manner is important to maintaining the security of the sensitive data.

Current security solutions, such as those used for encryption, cross domain, multi-level security, etc., would benefit from using commercially available System on Chip (SoC) FPGAs in order to reduce the size, weight, and power of the solutions while offering a maximum degree of reprogrammability. Current state of the art FPGAs are MPSoCs. MPSoC FPGAs generally include one or more soft core processor hosted in the FGPA fabric and one or more hard core microprocessor that most often have considerable control over the loading (i.e., programming) and reloading (i.e., reprogramming) of the FPGA fabric. In many cases, the highest level of security may be achieved through the logic (firmware (FW)) hosted in the FPGA fabric. Software (SW) hosted on the hard core microprocessor(s) is often considered to be less secure. However, hard core microprocessors typically provide significantly higher performance than soft-core processors hosted within the FPGA fabric (FW).

Both hard core processors and soft core processors can be subject to a significant level of attack by malicious software. Accordingly, the ability to leverage these MPSoC FPGA-based solutions for high assurance security applications is hindered because customers or designers of many security solutions are refusing to permit MPSoC FPGAs that include hard-core processors to be used for high assurance applications.

SUMMARY OF THE INVENTION

The present disclosure provides a MPSoC FPGA that can be applied to security solutions and the like where a "fail secure" scenario is acceptable, in which the SoC FPGA will not function if compromised. Embodiments of the present disclosure ensure that any unauthorized changes to the FPGA fabric are prohibited through use of internal monitoring hardware, firmware, and/or software that is coupled with external watchdog logic that is triggered to cause a fail secure hard reset of the at least one hard core processor if logic hosted in the FPGA fabric is over written or modified.

The present disclosure is directed, in a first aspect, to a system for securing a system-on-chip (SoC) field programmable gate array (FPGA). The system includes a SoC FPGA having an FPGA fabric, at least one soft core processor hosted within the FPGA fabric, and at least one hard core processor. The system further includes a secure boot environment for the SoC FPGA, monitoring logic configured to monitor for a change in the FPGA fabric, and external watchdog logic. The external watchdog logic is configured to receive a trigger signal from the monitoring logic, and force hard core processors of the SoC FPGA into a reset state with no ability to recover unless power is cycled to the SoC FPGA when a change has been made to the FPGA fabric.

In an embodiment, the external watchdog logic may include one or more watchdog timer circuit that latches and sends a reset signal to force the reset state upon expiration of a timer without receiving a trigger signal from the monitoring logic.

In another embodiment, a duration of the timer may be configured to be shorter than a time period required to reprogram the SoC FPGA.

In a further embodiment, the monitoring logic may be hosted in the FPGA fabric and may provide a timer reset signal as the trigger signal to the one or more watchdog timer circuit prior to expiration of the timer when there is no change to the FPGA fabric.

In yet another embodiment, the monitoring logic may be hosted in the at least one soft core processor hosted in the FPGA fabric.

In one or more embodiments, the monitoring logic may be hosted in normal logic functions of the FPGA fabric and may include at least one logic block that, if overwritten, will fail to provide the timer reset signal.

In another embodiment, the monitoring logic may be hosted in software executing on the at least one hard core processor and may provide a timer reset signal as the trigger signal to the one or more watchdog timer circuit prior to expiration of the timer when there is no change to the FPGA fabric.

In a further embodiment, the external watchdog logic may send a reset signal to force the reset upon receiving a trigger signal from the monitoring logic.

In yet another embodiment, the monitoring logic may be hosted in external hard logic and may provide the trigger signal upon detecting a logic change in the FPGA fabric.

In an embodiment, the monitoring logic may be hosted in firmware hosted in the FPGA fabric and may provide the trigger signal upon detecting a logic change in the FPGA fabric.

In another embodiment, the monitoring logic may be hosted in software executing on the at least one soft core hosted by the FPGA fabric and may provide the trigger signal upon detecting a logic change in the FPGA fabric.

In a further embodiment, the monitoring logic may be hosted in software executing on the at least one hard processor and may provide the trigger signal upon detecting a logic change in the FPGA fabric.

In yet another embodiment, the external watchdog logic may include an instant-on non-volatile FPGA.

In one or more embodiments, the system may further include additional monitoring logic configured to monitor for changes in software executing on the at least one hard core processor, wherein the external watchdog logic is further configured to receive an additional trigger signal from the additional monitoring logic, and force hard core processors of the SoC FPGA into a reset state with no ability to recover unless power is cycled to the SoC FPGA when a change in the software is detected.

The present disclosure is also directed, in a second aspect, to a secure system-on-chip (SoC) field programmable gate array (FPGA). The secure SoC FPGA includes an FPGA fabric, at least one soft core processor hosted within the FPGA fabric, and at least one hard core processor. The secure SoC FPGA further includes a secure boot environment, monitoring logic configured to monitor for a change in the FPGA fabric, and watchdog logic external to the FPGA fabric and at least one hard core processor. The watchdog logic is configured to receive a trigger signal from the monitoring logic based upon whether or not a change has been detected, and force hard core processors of the SoC FPGA into a reset state with no ability to recover unless power is cycled to the SoC FPGA when a change is made to the FPGA fabric.

In an embodiment, the monitoring logic may include at least one of firmware hosted on the FPGA fabric, software hosted on the at least one soft core, software hosted on the at least one hard core, and hard logic external to the FPGA fabric and at least one hard core processor.

In another embodiment, the trigger signal may be a timer reset signal provided to the watchdog logic when a change has not been detected, the watchdog logic may include one or more watchdog timer circuit that that latches and sends a reset signal to force the reset upon expiration of a timer without receiving the timer reset signal, and a duration of the timer may be configured to be shorter than a time period required to reprogram the SoC FPGA.

The present disclosure is further directed, in a third aspect, to a method for securing a system-on-chip (SoC) field programmable gate array (FPGA). The method includes operating a SoC FPGA in a secure boot environment, wherein the SoC FPGA includes an FPGA fabric, at least one soft core processor hosted within the FPGA fabric, and at least one hard core processor. The method further includes monitoring the FPGA fabric for a change, providing a trigger signal to external watchdog logic based on whether or not a change has been detected, and upon a determination that a change to the FPGA fabric has been detected, the external watchdog logic forcing hard core processors of the SoC FPGA into a reset state with no ability to recover unless power is cycled to the SoC FPGA.

In an embodiment, monitoring the FPGA fabric for a change may be performed by at least one of firmware hosted on the FPGA fabric, software hosted on the at least one soft core, software hosted on the at least one hard core, and external hard logic.

In another embodiment, the trigger signal may be timer reset signal provided to the external watchdog logic when a change has not been detected, the external watchdog logic may include one or more watchdog timer circuit that that latches and sends a reset signal to force the reset upon expiration of a timer without receiving the timer reset signal, and a duration of the timer may be configured to be shorter than a time period required to reprogram the SoC FPGA.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

The embodiments of the present disclosure can comprise, consist of, and consist essentially of the features and/or steps described herein, as well as any of the additional or optional ingredients, components, steps, or limitations described herein or would otherwise be appreciated by one of skill in the art. As used herein, "external" in reference to logic elements refers to logic elements that are outside of the FPGA fabric, a soft core processor of the FPGA, or a hard core of the FPGA. Thus, an external element may be disposed on the chip of the SoC or may be separate therefrom. Further, because the SoC FPGAs of the present disclosure include one or more soft core processors and one or more hard core processors, the terms SoC FPGA and MPSoC FPGA as used herein may be used interchangeably.

The present disclosure is directed to a one or more embodiments of a secure MPSoC FPGA having a hard core processor that uses external watchdog logic to force a hard reset of the hard core processor when changes to the FPGA fabric have been detected by monitoring logic. When used with a safe boot environment, forcing the hard core processor into a reset state with no ability to recover unless power is removed results in a fail secure scenario to prevent any harm resulting from a malicious attack. The monitoring logic includes at least one of monitoring firmware (FW) logic, monitoring software (SW) logic, and/or monitoring hard (HW) logic operating on the MPSoC FPGA. The placement and number of the monitoring logic can be increased (or decreased) dependent upon the level of desired security (or acceptable risk) as compared to size, weight, and power considerations for the application.

Figure 1:
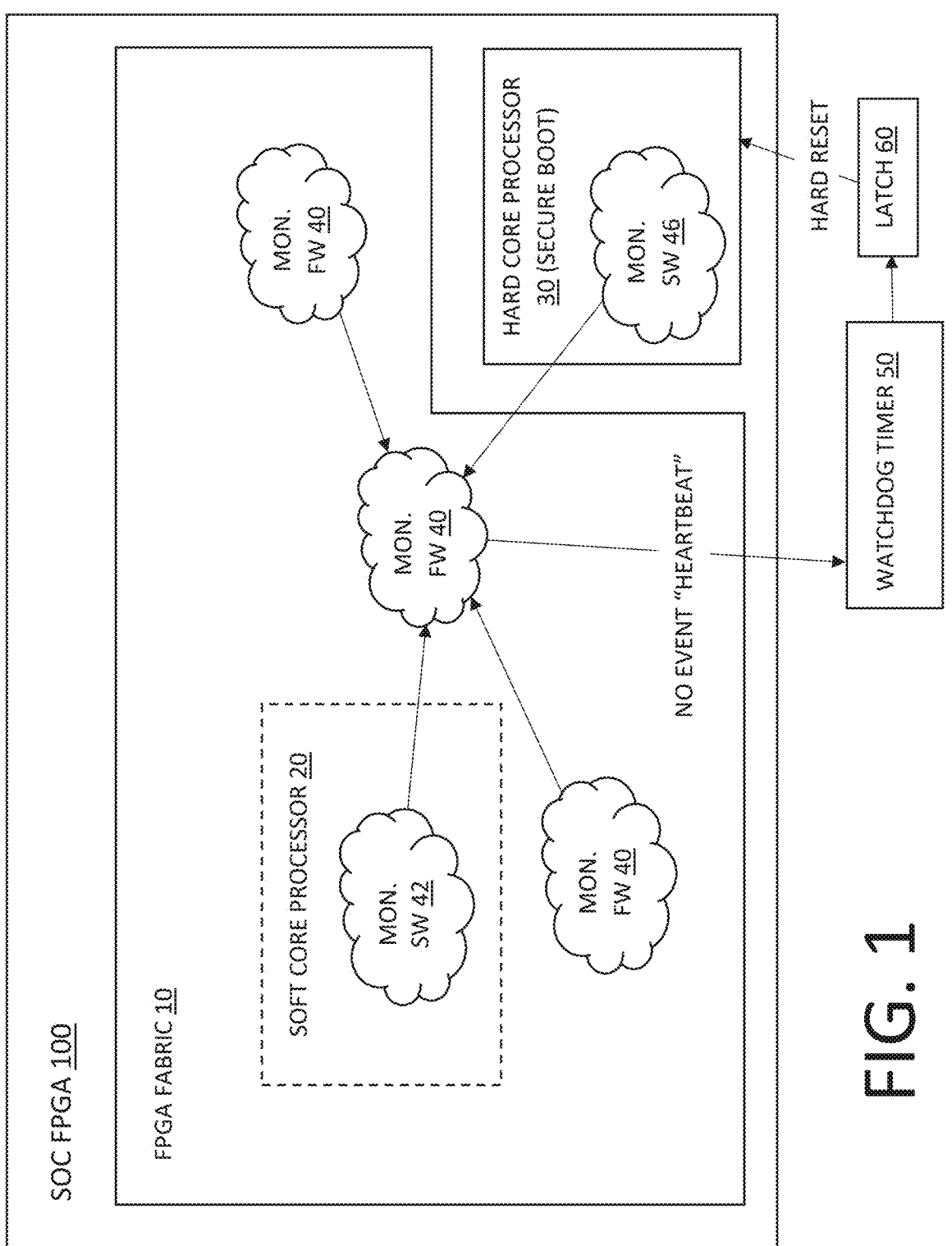
FIG. 1 is schematic view of a first embodiment in accordance with the present disclosure.
Figure 2:
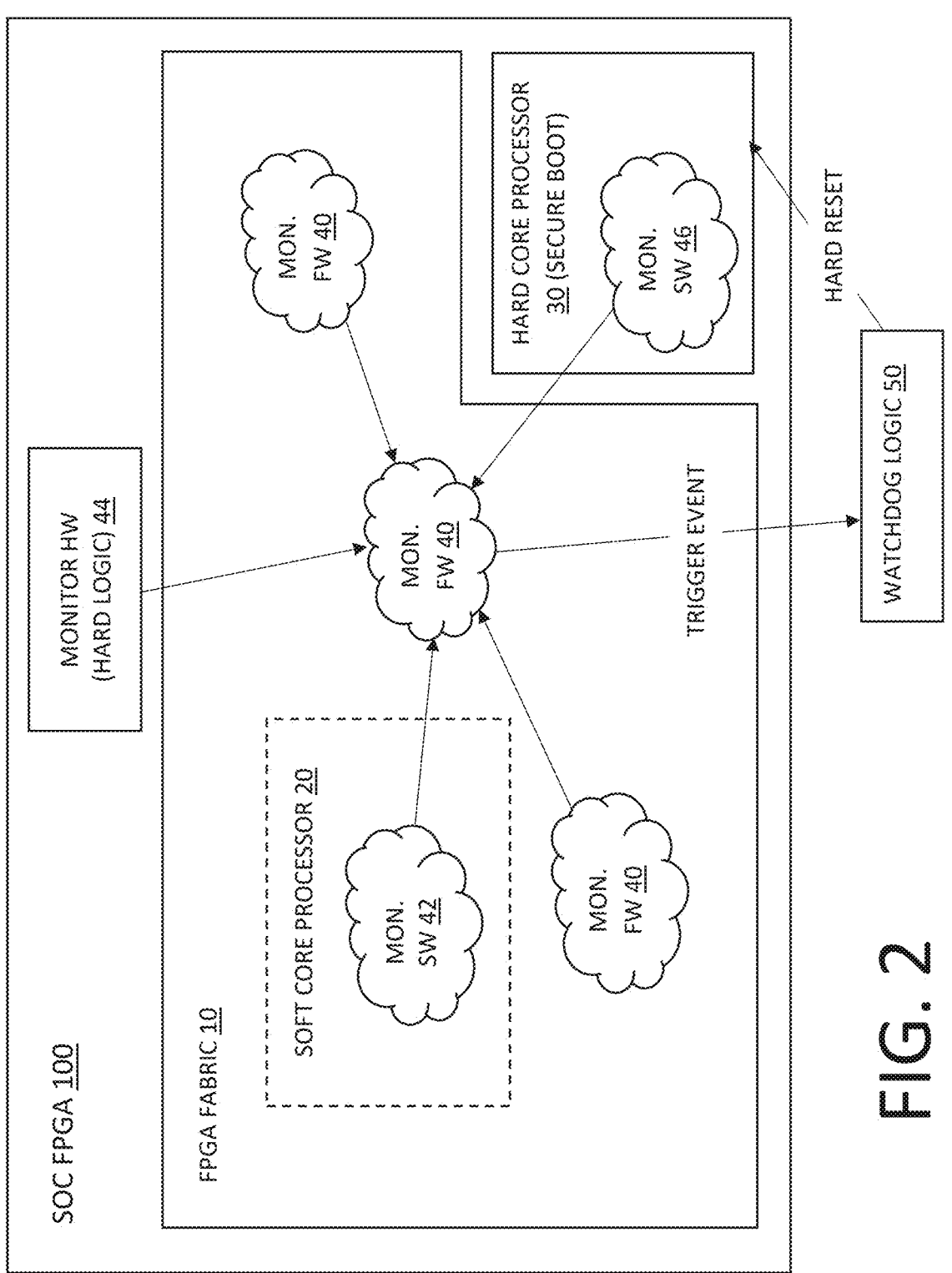
FIG. 2 is schematic view of a second embodiment in accordance with the present disclosure.
Figure 3:
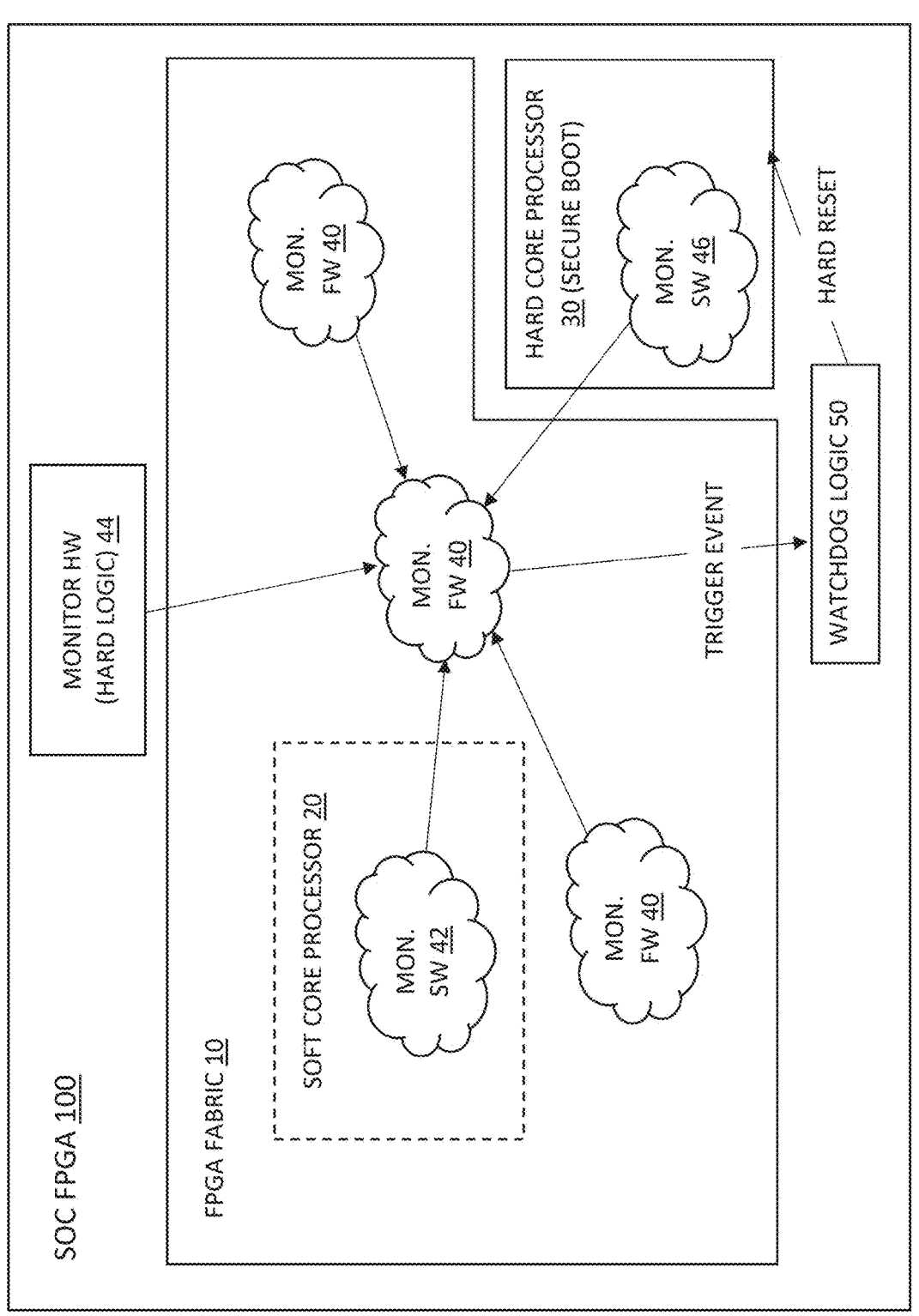
FIG. 3 is schematic view of a third embodiment in accordance with the present disclosure.

Referring to FIGS. 1, 2, and 3, a system for securing a system-on-chip (SoC) field programmable gate array (FPGA) 100 includes a SOC FPGA 100 having an FPGA fabric 10, at least one soft core processor 20 hosted within the FPGA fabric 10, and at least one hard core processor 30.

The SoC FPGA 100 includes a secure boot environment. The secure boot environment establishes a secure initial state for the SoC FPGA 100 to start from when powered up. The secure boot process may be based on a root of trust that is generally responsible for storing a root key. That root key may be used to protect other keys as needed to support various encryption functions such as "signatures" of software/firmware/hardware or some other compressed representation of the software/firmware/hardware (e.g. hash of executable trace) and encryption of software/firmware that renders it unmodifiable by an adversary. In an example, a factory may sign and encrypt all software/firmware and non-root keys and store them in nonvolatile memory co-located and accessible by the SoC FPGA 100. Then at boot time the root of trust provides the root key(s) which is used to decrypt and verify signatures for all software/firmware. Software/firmware can also be used to generate a "finger-print" of the hardware that can also be compared to a protected value to enable verification that the hardware is correct as well. Once all of the verification is completed, the verified software/firmware is loaded into the hardware and secure initial state is achieved.

SoC FGPA 100 may be, for example, one of the Zynq™ 7000, Zynq™ MPSoC, Zynq™ UltraScale+ or Versal™ series of SoC FGPAs available from Xilinx, Inc. or equiva-lent devices from other FPGA vendors such as Intel/Altera, Lattice, Microsemi, Achronix, Microchip Technology, etc.

The SoC FPGA 100 further includes monitoring logic 40, 42, 44, and/or 46 that is at least configured to monitor for a change in the FPGA fabric 10. Monitoring logic 40 may be hosted as firmware (FW) in the FPGA fabric 10. In one or more embodiments, the FW monitoring logic 40 may be hosted in multiple locations within the FPGA fabric 10 such that a change to a portion of the FPGA fabric 10 may be detected. Monitoring logic 42 may be hosted as software (SW) executing in the soft core processor 20. Monitoring logic 46 may also be hosted as software (SW) executing in the hard core processor 30. In various embodiments, moni-toring logic 40, 42, 44, and/or 46 may be chained, or linked, or used in parallel so as to drive one or more trigger signals or outputs.

In the embodiments of FIGS. 2 and 3, monitoring logic 44 may further be hosted as hardware (HW) operating on hard logic provided on SoC FPGA 100 that is external to the FPGA fabric 10, soft core processor(s) 20, and hard core processor(s) 30.

Monitoring logic 40, 42, 44, and/or 46 may use any suitable technique to identify changes to the firmware and/or software. For example, a continuous running function may read out the programmed memory used to define all of the programmable logic and compare it to the known "correct" value(s). If any "bit" changes, the function would produce a trigger event that would drive the device to the hard reset. Similar functions could be performed at runtime to monitor the software running in RAM and watch for any "modified" code being executed. Further, although a firmware function that is calculating a finger print of the hardware is more typical, it is also possible to have a hardware function that is knows the fingerprint for other hardware blocks within the device and periodically or continuously monitors that for changes.

The SoC FPGA 100 also includes external watchdog logic 50. Watchdog logic 50 is configured to receive a trigger signal from the monitoring logic 40, 42, 44, and/or 46 force hard core processor(s) 30 of the SoC FPGA 100 into a reset state with no ability to recover unless power is cycled to the SoC FPGA 100 when a change has been made to the FPGA fabric 10. Although only a single hard reset signal is illustrated for a single hard core processor 30, multiple hard resets can be sent when multiple hard core processors 30 are present. In further embodiments, redundancy (i.e., multiple resets or differential resets) may be implemented for each separate hard core processor when available or desired.

Although monitoring logic 40, 42, 44, and 46 is illustrated in a star topology, this is merely an example for clarity of the drawings and monitoring logic 40, 42, 44, and/or 46 may otherwise indirectly or directly signal external watchdog logic 50 without departing from the inventive concepts. In various embodiments, monitoring logic 40, 42, 44, and/or 46 may be chained, or linked, or used in parallel so as to drive one or more outputs to external watchdog logic 50.

As discussed further below, a trigger signal from the monitoring logic 40, 42, and/or 46 may indicate a non-event of normal operation via generation of a "heartbeat" signal or the trigger signal from the monitoring logic 40, 42, 44, and/or 46 may relate to an event of a detected change in the FPGA fabric 10 or, as discussed below, a detected change in the software of the one or more hard core processor(s) 30.

In the embodiment of FIG. 1, the watchdog logic 50 may be provided by a watchdog timer 50 circuit or chip. In one or more other embodiments illustrated generally by FIGS. 2 and 3, the watchdog logic 50 may be provided by any suitable non-volatile logic, including but not limited to instant-on non-volatile FPGAs (e.g., flash, m-ram, eprom), ASICs, and the like. The watchdog logic 50 may be physi-cally separate from the SoC FPGA 100 and should only include a single input for the trigger signal and a single output of the hard reset signal so as to be otherwise isolated from the logic of the SoC FPGA 100. In this manner, the watchdog logic 50 is isolated from attack vectors against the SoC FPGA 100.

In the embodiment of FIG. 1, the external watchdog logic 50 is provided by one or more watchdog timer 50 circuit that forces the reset upon expiration of a timer without receiving a trigger signal in the form of a no-event heartbeat from the monitoring logic 40, 42, or 46. In one or more embodiments, the monitoring logic 40, 42, and/or 46 provides a periodic signal during normal operation, i.e., a "heartbeat" signal. The period of the heartbeat signal is selected to be shorter than a time period required to reprogram the SoC FPGA 100 such that a generation of the periodic signal will be missed at least once during an unauthorized reprogramming. Addi-tionally, a duration of the timer in the watchdog timer 50 is also configured to be shorter than the time period required to reprogram the SoC FPGA. The no-event heartbeat signal resets the watchdog timer 50 prior to expiration of the timer during normal operation. However, a missed heartbeat sig-nal will cause a latch 60 resulting in sending a hard reset signal forcing hard core processor(s) 30 of the SoC FPGA 100 into a reset state with no ability to recover unless power is cycled to the SoC FPGA 100.

In one or more embodiments, FW monitoring logic 40 may be hosted in normal logic functions of the FPGA fabric 10, and FW monitoring logic 40 may include at least one logic block that, if overwritten, will fail to provide a heart-beat trigger signal. In this manner, overwrites caused by unauthorized changes to the FPGA fabric 10 will cause a hard reset of the hard core processor(s) 30 and a fail secure scenario that prevents harm.

Additionally or alternatively, in one or more embodi-ments, SW monitoring logic 42 may be hosted in the software of the at least one soft core processor 20, and SW monitoring logic 42 may include at least one logic block that, if overwritten, will fail to provide a heartbeat trigger signal. In this manner, overwrites caused by unauthorized changes to the soft core processor(s) 20 will cause a hard reset of the hard core processor(s) 30 and a fail secure scenario that prevents harm.

Additionally or alternatively, in one or more embodi-ments, SW monitoring logic 46 may be hosted in the software of the at least one hard core processor 30 and may be configured to provide a heartbeat timer reset signal as the trigger signal to the one or more watchdog timer 50 circuit prior to expiration of the timer when there is no detected change to the FPGA fabric 10. In this manner, a detected change caused by an unauthorized change to the FPGA fabric 10 will cause a hard reset of the hard core processor(s) 30 and a fail secure scenario that prevents harm.

Additionally, in one or more embodiments, SW monitoring logic 46 may be hosted in the software of the at least one hard core processor 30, and SW monitoring logic 46 may include at least one logic block that, if overwritten, will fail to provide a heartbeat trigger signal. In this manner, overwrites caused by unauthorized changes to the software of the hard core processor(s) 30 may also cause a hard reset of the hard core processor(s) 30 and a fail secure scenario that prevents harm.

Referring to FIGS. 2 and 3, in one or more embodiments, monitoring logic 40, 42, 44, and/or 46 may only send a trigger signal in response to detecting a change in the FPGA fabric 10. In such embodiments, the external watchdog logic 50 forces the reset of the hard core processor(s) 30 upon receiving a trigger signal from the monitoring logic 40, 42, 44, and/or 46.

In one or more embodiments, the HW monitoring logic 44 may be disposed in external hard logic and may provide the trigger signal (i.e., trigger event signal) upon detecting a logic change in the FPGA fabric 10. The external hard logic of HW monitoring logic 44 may be provided on circuitry disposed on SoC FPGA 100, but which is external from the FGPA fabric 10, soft core processor(s) 20, and hard core processor(s) 30. In one or more embodiments, the HW monitoring logic 44 disposed in the external hard logic may further monitor the software hosted on the hard core processor(s) 30 and may provide the trigger signal upon detecting a logic change in the software on the hard core processor(s) 30. In an example, HW monitoring logic 44 may be provided on a security monitor IP core available on certain SoC FPGAs from Xilinx, Inc.

In one or more further embodiments, the FW monitoring logic 40 may be hosted in firmware hosted in the FPGA fabric 10 and may provide the trigger signal upon detecting a logic change in the FPGA fabric 10. In certain embodiments, the FW monitoring logic 40 may also monitor software hosted on the hard core processor(s) 30 and may provide the trigger signal upon detecting a logic change in the software on the hard core processor(s) 30.

In one or more embodiments, the SW monitoring logic 42 may be software executing in the at least one soft core 20 hosted by the FPGA fabric 10 and may provide the trigger signal upon detecting a logic change in the FPGA fabric 10. In certain embodiments, the SW monitoring logic 42 may also monitor software hosted on the hard core processor(s) 30 and may provide the trigger signal upon detecting a logic change in the software on the hard core processor(s) 30. As noted earlier, in various embodiments, the monitoring logic 40, 42, 44, and/or 46 may be chained, or linked, or used in parallel so as to drive one or more trigger signals or outputs.

In one or more embodiments, the SW monitoring logic 46 may be hosted in software executing on the at least one hard processor 30 and may provide the trigger signal upon detecting a logic change in the FPGA fabric 10.

Referring to FIGS. 2 and 3, the external watchdog logic 50 in one or more embodiments may include an instant-on non-volatile FPGA. In an example, a flash-based non-volatile FPGA may be used. As illustrated in FIG. 2, the external watchdog logic 50 may be separate and isolated from the SoC FPGA 100. However, so long as the watchdog logic 50 is instant-on, non-volatile, and isolated from the SoC FPGA except for the input of a trigger event signal and output of a reset signal, it may be included on the SoC FPGA 100, as illustrated in FIG. 3.

Thus, with reference to FIG. 3, the present disclosure is also directed to a one or more embodiments of a secure SoC FPGA 100. The secure SoC FPGA 100 includes an FPGA fabric 10, at least one soft core processor 20 hosted within the FPGA fabric 10, at least one hard core processor 30 operating with a secure boot environment, monitoring logic 40, 42, 44, and/or 46 configured to monitor for a change in the FPGA fabric 10, and watchdog logic 50 external to the FPGA fabric 10 and at least one hard core processor 30. As with other embodiments, the watchdog logic 50 is configured to receive a trigger signal from the monitoring logic 40, 42, 44, and/or 46 based upon whether or not a change has been detected, and to force hard core processor(s) 30 of the SoC FPGA 100 into a reset state with no ability to recover unless power is cycled to the SoC FPGA 100 when a change is made to the FPGA fabric 10.

In one or more embodiments of the secure SoC FGPA 100, the monitoring logic may include at least one of FW monitoring logic 40 hosted on the FPGA fabric 10, SW monitoring logic 42 hosted on the at least one soft core 20, SW monitoring logic 46 hosted on the at least one hard core 30, and HW monitoring logic 44 in hard logic external to the FPGA fabric 10 and at least one hard core processor 30. Variation may include any logical combination of these forms of monitoring logic.

In other embodiments of a secure SOC FPGA 100, the trigger signal may be a timer reset signal provided to the watchdog logic 50 when a change has not been detected, wherein the watchdog logic 50 is provided via one or more watchdog timer 50 circuit that forces the reset upon expiration of a timer without receiving the timer reset signal, and wherein a duration of the timer is configured to be shorter than a time period required to reprogram the secure SoC FPGA 100.

Figure 4A:
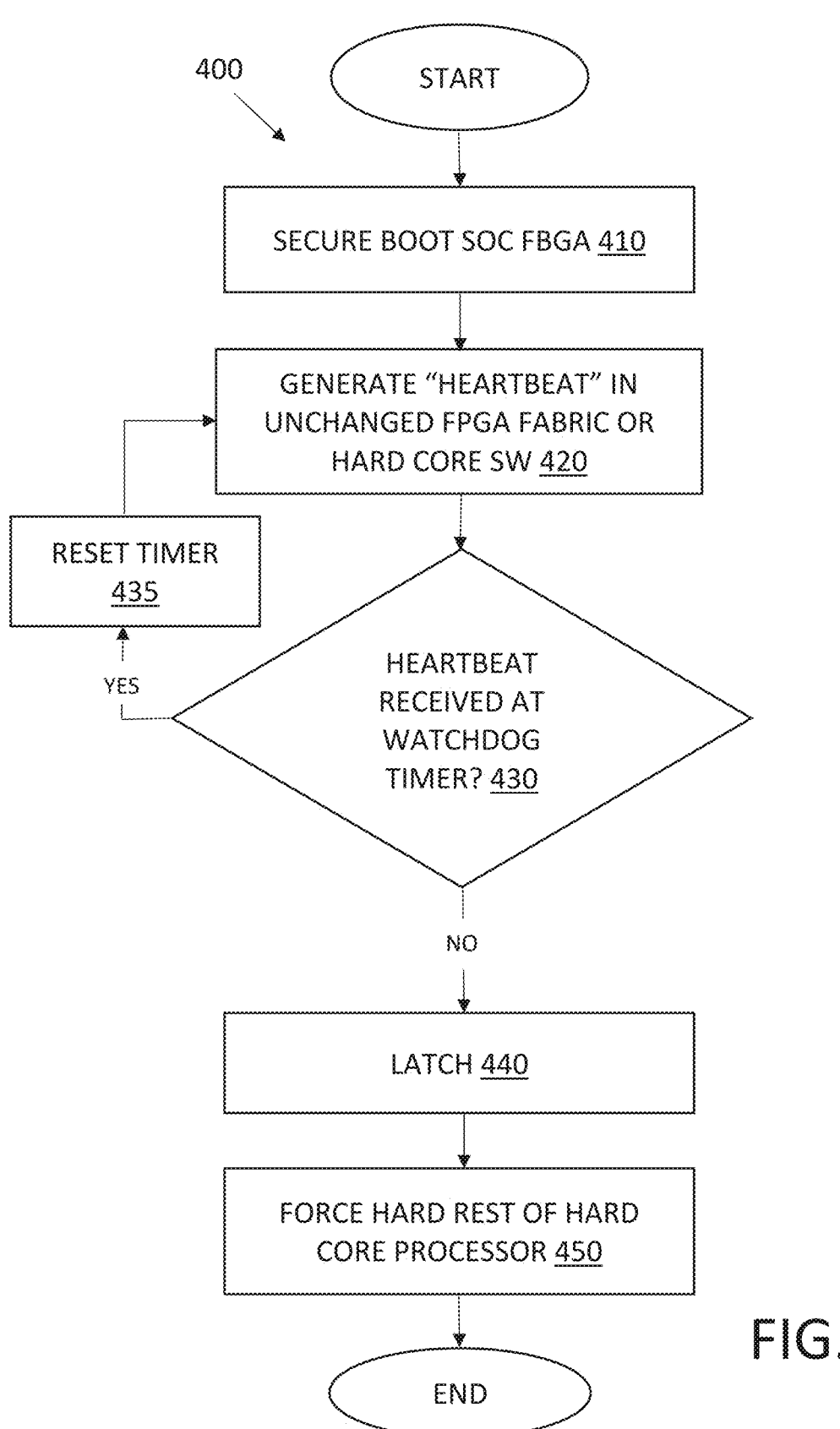
FIG. 4A is flow diagram of an example method using watchdog timer logic in accordance with the present disclosure.
Figure 4B:
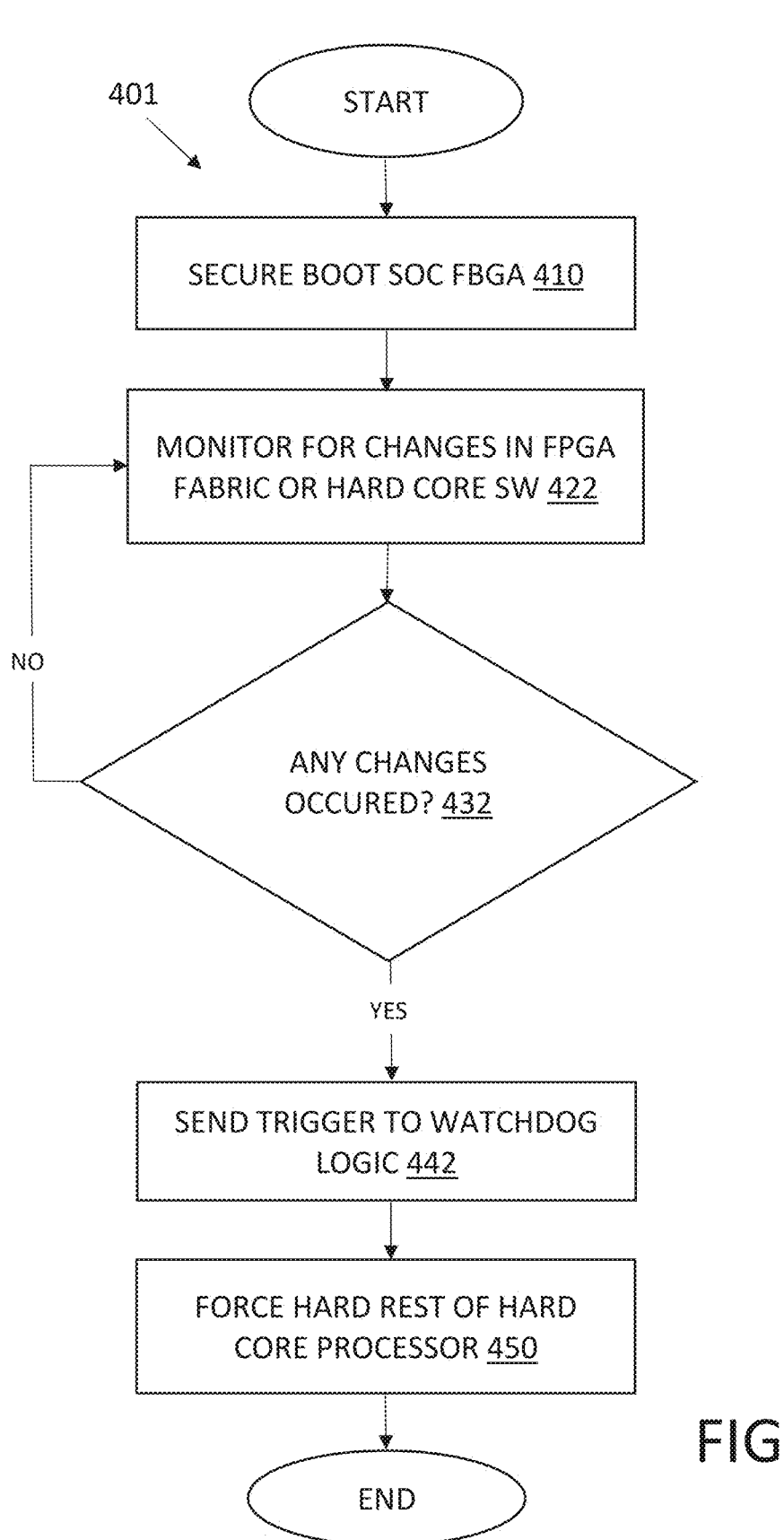
FIG. 4B is flow diagram of another example method using monitoring logic in accordance with the present disclosure.

With reference to FIGS. 4A and 4B, the present disclosure is also directed to a one or more embodiments of a method 400 or 401 for securing a MPSoC FPGA. The method 400 or 401 includes operating a SoC FPGA 100 in a secure boot environment, wherein the SoC FPGA 100 includes an FPGA fabric 10, at least one soft core processor 20 hosted within the FPGA fabric 10, and at least one hard core processor 30, thereby making the SoC FPGA 100 a MPSoC FPGA. The method 400 or 401 also includes monitoring the FPGA fabric 10 and/or software of the hard core processor(s) 30 for a change, providing a trigger signal to external watchdog logic 50 based on whether or not a change has been detected, and upon a determination that a change to the FPGA fabric 10 and/or software hosted on the hard core processor(s) has been detected, the external watchdog logic 50 forcing hard core processor(s) 30 of the SoC FPGA 100 into a reset state with no ability to recover unless power is cycled to the SoC FPGA 100.

In one or more embodiments of method 400, the trigger signal of the heartbeat signal is a timer reset signal provided to the external watchdog logic 50 when a change has not been detected, wherein the external watchdog logic 50 comprises one or more watchdog timer 50 circuit that forces the reset upon expiration of a timer without receiving the timer reset signal, and wherein a duration of the timer is configured to be shorter than a time period required to reprogram the SoC FPGA 100.

Specifically, embodiments of method 400 include performing at step 410 a secure boot of SoC FPGA 100 of FIG. 1. At step 420, monitoring logic 40, 42, and/or 46 generate a heartbeat no-event signal when the FPGA fabric 10 is unchanged or when the software hosted on hard core processor(s) 30 is unchanged. If a logical block generating the heartbeat signal at step 420 has been overwritten, no heartbeat signal will be generated.

At step 430, method 400 determines whether a heartbeat signal has been received at watchdog timer 50. If a heartbeat signal has been generated by normally-operating logic on the SOC FPGA 100, the determination at step 430 will be "YES" and the signal resets the timer operation of the watchdog timer 50 at step 435. If a heartbeat signal has not been generated because the logical block(s) to generate the heartbeat signal has/have been overwritten, the determination at step 430 will be "NO" and the watchdog timer 50 will latch 60 at step 440. The latch 60 will force a hard reset of hard core processor(s) 30 at step 450 by sending a reset signal. This results in a fail secure scenario that puts SoC FPGA 100 into a reset state with no ability to recover unless power is cycled.

Embodiments of method 401 include performing at step 410 a secure boot of SOC FPGA 100 of FIG. 2 or 3. At step 422, monitoring logic 40, 42, 44, and/or 46 monitor for changes in the FPGA fabric 10 and/or the software hosted on the hard core processor(s) 30.

At step 432, monitoring logic 40, 42, 44, and/or 46 determines whether any changes have occurred in the FPGA fabric 10 and/or the software hosted on the hard core processor(s) 30. If not, the determination at step 432 will be "NO" and the monitoring of step 422 will continue. If the determination at step 432 is "YES," monitoring logic 40, 42, 44, and/or 46 sends a trigger to watchdog logic 50 at step 442. The watchdog logic 50 will then force a hard reset of hard core processor(s) 30 at step 450. This results in a fail secure scenario that puts SoC FPGA 100 into a reset state with no ability to recover unless power is cycled.

In one or more embodiments of method 401, monitoring the FPGA fabric 10 for a change at step 422 is performed by at least one of firmware hosted on the FPGA fabric 10, software hosted on the at least one soft core 20, software hosted on the at least one hard core 30, and external hard logic 44.

In order to facilitate authorized changes to the FPGA fabric 10, such as authenticated factory reprogramming or field/depot reprogramming, external logic and interfaces may be provided to determine if a change is authorized or not. Any suitable means may be used for signaling, designating or otherwise indicating an approved, authenticated, authorized, trusted, or otherwise secure status of an entity attempting to perform an authorized change to the FPGA fabric 10, including but not limited to multi-factor authentication (MFA), public key cryptography, certificates, chain of trust, tokens, and the like.

However, in certain embodiments, only a physical port within a tamperproof hardware boundary may be used to allow reprogramming such that any changes to the FPGA fabric 10 would also require physical access to the SoC FPGA 100.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A system for securing a system-on-chip (SoC) field programmable gate array (FPGA), the system comprising:
   a SoC FPGA having an FPGA fabric, at least one soft core processor hosted within the FPGA fabric, and at least one hard core processor;
   a secure boot environment for the SoC FPGA;
   monitoring logic configured to monitor for a change in the FPGA fabric; and
   external watchdog logic configured to:
      receive a trigger signal from the monitoring logic; and
      force hard core processors of the SoC FPGA into a reset state with no ability to recover unless power is cycled to the SoC FPGA when a change has been made to the FPGA fabric.

2. The system of claim 1, wherein the external watchdog logic comprises one or more watchdog timer circuit that latches and sends a reset signal to force the reset state upon expiration of a timer without receiving a trigger signal from the monitoring logic.

3. The system of claim 2, wherein a duration of the timer is configured to be shorter than a time period required to reprogram the SoC FPGA.

4. The system of claim 2, wherein the monitoring logic is hosted in the FPGA fabric and provides a timer reset signal as the trigger signal to the one or more watchdog timer circuit prior to expiration of the timer when there is no change to the FPGA fabric.

5. The system of claim 4, wherein the monitoring logic is hosted in the at least one soft core processor hosted in the FPGA fabric.

6. The system of claim 4, wherein the monitoring logic is hosted in normal logic functions of the FPGA fabric and includes at least one logic block that, if overwritten, will fail to provide the timer reset signal.

7. The system of claim 2, wherein the monitoring logic is hosted in software executing on the at least one hard core processor and provides a timer reset signal as the trigger signal to the one or more watchdog timer circuit prior to expiration of the timer when there is no change to the FPGA fabric.

8. The system of claim 1, wherein the external watchdog logic sends a reset signal to force the reset upon receiving a trigger signal from the monitoring logic.

9. The system of claim 8, wherein the monitoring logic is hosted in external hard logic and provides the trigger signal upon detecting a logic change in the FPGA fabric.

10. The system of claim 8, wherein the monitoring logic is hosted in firmware hosted in the FPGA fabric and provides the trigger signal upon detecting a logic change in the FPGA fabric.

11. The system of claim 8, wherein the monitoring logic is hosted in software executing on the at least one soft core hosted by the FPGA fabric and provides the trigger signal upon detecting a logic change in the FPGA fabric.

12. The system of claim 8, wherein the monitoring logic is hosted in software executing on the at least one hard processor and provides the trigger signal upon detecting a logic change in the FPGA fabric.

13. The system of claim 1, wherein the external watchdog logic comprises an instant-on non-volatile FPGA.

14. The system of claim 1, further comprising additional monitoring logic configured to monitor for changes in software executing on the at least one hard core processor, wherein the external watchdog logic is further configured to:
   receive an additional trigger signal from the additional monitoring logic; and force hard core processors of the SoC FPGA into a reset state with no ability to recover unless power is cycled to the SoC FPGA when a change in the software is detected.

15. A secure system-on-chip (SoC) field programmable gate array (FPGA), the secure SoC FPGA comprising:

an FPGA fabric;

at least one soft core processor hosted within the FPGA fabric;

at least one hard core processor;

a secure boot environment;

monitoring logic configured to monitor for a change in the FPGA fabric; and watchdog logic external to the FPGA fabric and at least one hard core processor, the watchdog logic configured to:

receive a trigger signal from the monitoring logic based upon whether or not a change has been detected; and force hard core processors of the SoC FPGA into a reset state with no ability to recover unless power is cycled to the SoC FPGA when a change is made to the FPGA fabric.

16. The secure SoC FPGA of claim 15, wherein the monitoring logic includes at least one of firmware hosted on the FPGA fabric, software hosted on the at least one soft core, software hosted on the at least one hard core, and hard logic external to the FPGA fabric and at least one hard core processor.

17. The secure SoC FPGA of claim 15, wherein the trigger signal is a timer reset signal provided to the watchdog logic when a change has not been detected, wherein the watchdog logic comprises one or more watchdog timer circuit that that latches and sends a reset signal to force the reset upon expiration of a timer without receiving the timer reset signal, and wherein a duration of the timer is configured to be shorter than a time period required to reprogram the SoC FPGA.

18. A method for securing a system-on-chip (SoC) field programmable gate array (FPGA), the method comprising:

operating a SoC FPGA in a secure boot environment, wherein the SoC FPGA includes an FPGA fabric, at least one soft core processor hosted within the FPGA fabric, and at least one hard core processor;

monitoring the FPGA fabric for a change;

providing a trigger signal to external watchdog logic based on whether or not a change has been detected; and upon a determination that a change to the FPGA fabric has been detected, the external watchdog logic forcing hard core processors of the SoC FPGA into a reset state with no ability to recover unless power is cycled to the SoC FPGA.

19. The method of claim 18, wherein monitoring the FPGA fabric for a change is performed by at least one of firmware hosted on the FPGA fabric, software hosted on the at least one soft core, software hosted on the at least one hard core, and external hard logic.

20. The method of claim 18, wherein the trigger signal is a timer reset signal provided to the external watchdog logic when a change has not been detected, wherein the external watchdog logic comprises one or more watchdog timer circuit that that latches and sends a reset signal to force the reset upon expiration of a timer without receiving the timer reset signal, and wherein a duration of the timer is configured to be shorter than a time period required to reprogram the SoC FPGA.

* * * * *